United States Patent
Zhu et al.

(10) Patent No.: US 12,088,746 B2
(45) Date of Patent: *Sep. 10, 2024

(54) CELL PHONE FRAME AND METHOD FOR MANUFACTURING THE SAME

(71) Applicant: JIANGSU KANGRUI NEW MATERIAL TECHNOLOGY CO., LTD., Jiangyin (CN)

(72) Inventors: Wei Zhu, Jiangyin (CN); Dong Cui, Jiangyin (CN)

(73) Assignee: Jiangsu Kangrui New Material Technology Co., Ltd., Jiangyin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/026,730

(22) PCT Filed: Feb. 24, 2022

(86) PCT No.: PCT/CN2022/077565
§ 371 (c)(1),
(2) Date: Mar. 16, 2023

(87) PCT Pub. No.: WO2022/183958
PCT Pub. Date: Sep. 9, 2022

(65) Prior Publication Data
US 2023/0344924 A1 Oct. 26, 2023

(30) Foreign Application Priority Data

Mar. 5, 2021 (CN) .......................... 202110246015.6
Mar. 5, 2021 (CN) .......................... 202110246026.4
(Continued)

(51) Int. Cl.
*H04M 1/02* (2006.01)
*B21D 51/16* (2006.01)
(Continued)

(52) U.S. Cl.
CPC ............ *H04M 1/026* (2013.01); *B21D 51/16* (2013.01); *B32B 15/01* (2013.01); *B32B 15/012* (2013.01);
(Continued)

(58) Field of Classification Search
CPC ........ B32B 15/01; B32B 15/017; B32B 15/20
See application file for complete search history.

(56) References Cited

U.S. PATENT DOCUMENTS

| 5,115,660 A | 5/1992 | Nisshin | |
| 2015/0338988 A1* | 11/2015 | Lee | G06F 3/0488 345/173 |
| 2023/0149993 A1* | 5/2023 | Zhu | B32B 37/10 29/17.4 |

FOREIGN PATENT DOCUMENTS

| CN | 1586751 A | 3/2005 |
| CN | 101559557 A | 10/2009 |

(Continued)

OTHER PUBLICATIONS

International Search Report, issued in PCT/CN2022/077564, dated May 31, 2022.
(Continued)

*Primary Examiner* — Jason L Vaughan
*Assistant Examiner* — Amanda Kreiling
(74) *Attorney, Agent, or Firm* — Zhu Lehnhoff LLP

(57) ABSTRACT

A cell phone frame, and a method for manufacturing the same, includes a composite plate. The composite plate encloses an accommodation space for accommodating the cell phone. The composite plate includes a first plate and a second plate, a first side surface of the first plate having striations. The first side surface of the second plate and the first side surface of the first plate are rolled to connect, and the striations of which adjacent ones have a pitch of 0.005

(Continued)

mm to 0.03 mm account for more than 90% of all the striations.

20 Claims, 7 Drawing Sheets

(30) Foreign Application Priority Data

| | | | |
|---|---|---|---|
| Mar. 5, 2021 | (CN) | ............... | 202110247262.8 |
| Mar. 5, 2021 | (CN) | ............... | 202110247263.2 |
| Mar. 5, 2021 | (CN) | ............... | 202110247280.6 |
| May 8, 2021 | (CN) | ............... | 202110498802.X |
| May 8, 2021 | (CN) | ............... | 202110498999.7 |
| May 8, 2021 | (CN) | ............... | 202110499000.0 |
| May 8, 2021 | (CN) | ............... | 202110499008.7 |
| May 8, 2021 | (CN) | ............... | 202110499009.1 |
| Oct. 12, 2021 | (WO) | ............... | PCT/CN2021/123163 |
| Nov. 1, 2021 | (WO) | ............... | PCT/CN2021/123161 |
| Nov. 1, 2021 | (WO) | ............... | PCT/CN2021/123162 |

(51) Int. Cl.
| | |
|---|---|
| *B32B 15/01* | (2006.01) |
| *B32B 15/20* | (2006.01) |
| *B32B 37/00* | (2006.01) |
| *B32B 37/06* | (2006.01) |
| *B32B 37/10* | (2006.01) |
| *B32B 38/00* | (2006.01) |
| *B32B 38/16* | (2006.01) |

(52) U.S. Cl.
CPC ............ *B32B 15/017* (2013.01); *B32B 15/20* (2013.01); *B32B 37/0053* (2013.01); *B32B 37/06* (2013.01); *B32B 37/10* (2013.01); *B32B 38/0012* (2013.01); *B32B 38/162* (2013.01); B32B 2307/536 (2013.01); B32B 2307/538 (2013.01); B32B 2307/54 (2013.01); B32B 2307/542 (2013.01); B32B 2307/7375 (2023.05); B32B 2307/7376 (2023.05); B32B 2311/18 (2013.01); B32B 2311/24 (2013.01); B32B 2311/30 (2013.01); Y10T 428/12201 (2015.01); Y10T 428/12743 (2015.01)

(56) References Cited

FOREIGN PATENT DOCUMENTS

| | | |
|---|---|---|
| CN | 102658686 A | 9/2012 |
| CN | 202623400 U | 12/2012 |
| CN | 102848136 A | 1/2013 |
| CN | 103394975 A | 11/2013 |
| CN | 203494905 U | 3/2014 |
| CN | 204701208 U | 10/2015 |
| CN | 105034526 A | 11/2015 |
| CN | 105478475 A | 4/2016 |
| CN | 105499269 A | 4/2016 |
| CN | 105798062 A | 7/2016 |
| CN | 106862271 A | 6/2017 |
| CN | 107278385 A | 10/2017 |
| CN | 107377656 A | 11/2017 |
| CN | 206728104 U | 12/2017 |
| CN | 107613048 A | 1/2018 |
| CN | 107770306 A | 3/2018 |
| CN | 207442919 U | 6/2018 |
| CN | 208826189 U | 5/2019 |
| CN | 209105265 U | 7/2019 |
| CN | 110654081 A | 1/2020 |
| CN | 110665968 A | 1/2020 |
| CN | 110681694 A | 1/2020 |
| CN | 110883093 A | 3/2020 |
| CN | 111318564 A | 6/2020 |
| CN | 111421446 A | 7/2020 |
| CN | 111715710 A | 9/2020 |
| CN | 112139237 A | 12/2020 |
| CN | 212240477 U | 12/2020 |
| JP | 2000312979 A | 11/2000 |
| JP | 2003094318 A | 4/2003 |
| JP | 2009255171 A | 11/2009 |
| JP | 2015128883 A | 7/2015 |
| KR | 20180102844 A | 9/2018 |
| WO | 2016207063 A1 | 12/2016 |
| WO | 2018181717 A1 | 10/2018 |

OTHER PUBLICATIONS

Written Opinion, issued in PCT/CN2022/077564, dated May 31, 2022.
International Search Report, issued in PCT/CN2022/077565, dated May 27, 2022.
Written Opinion, issued in PCT/CN2022/077565, dated May 27, 2022.
International Search Report, issued in PCT/CN2022/077563, dated May 26, 2022.
Written Opinion, issued in PCT/CN2022/077563, dated May 26, 2022.
International Search Report, issued in PCT/CN2021/123162, dated Jan. 17, 2022.
Written Opinion, issued in PCT/CN2021/123162, dated Jan. 17, 2022.
International Search Report, issued in PCT/CN2021/123163, dated Jan. 18, 2022.
Written Opinion, issued in PCT/CN2021/123163, dated Jan. 18, 2022.
International Search Report, issued in PCT/CN2021/123161, dated Mar. 2, 2022.
Written Opinion, issued in PCT/CN2021/123161, dated Mar. 2, 2022.
U.S. Appl. No. 17/800,317, filed Aug. 17, 2022, Jiangsu Kangrui New Material Technology Co., Ltd., Entire document.
U.S. Appl. No. 17/917,220, filed Oct. 5, 2022, Jiangsu Kangrui New Material Technology Co., Ltd., Entire document.
U.S. Appl. No. 17/917,224, filed Oct. 5, 2022, Jiangsu Kangrui New Material Technology Co., Ltd., Entire document.
U.S. Appl. No. 18/026,715, filed Mar. 16, 2023, Jiangsu Kangrui New Material Technology Co., Ltd., Entire document.
U.S. Appl. No. 18/026,737, filed Mar. 16, 2023, Jiangsu Kangrui New Material Technology Co., Ltd, Entire document.

* cited by examiner

CELL PHONE FRAME AND METHOD FOR MANUFACTURING THE SAME

TECHNICAL FIELD

The present invention relates to the technical field of cell phone accessories, more particularly, to a cell phone frame and a method for manufacturing the same.

BACKGROUND ART

The advent of the age of intelligence has witnessed an increasing demand of people for cell phones. Cell phone manufacturers are trying their best in innovating and redesigning various features of cell phones to attract consumers. Many processes and methods have been tried in manufacturing a cover plate, an important part of a cell phone, which, however, has often been ended up with failures, therefore, the choice of method is extremely critical because it directly affects the yield and production efficiency.

A steel-aluminum composite plate is advantageous by combining the high strength and good plasticity of steel and good electrical conductivity, thermal conductivity, corrosion resistance, and low density of aluminum. Steel-aluminum composite plates are common in subway contact rails in rail transit, vehicle body materials of automobiles and high-speed trains, and bearing shell materials of engines. A variety of heat sinks and cookware made of steel/aluminum composite materials have been launched in the market because of the good thermal conductivity of aluminum. In addition, the steel-aluminum composite plate has a wide application in many fields such as machinery, ships, nuclear energy, and electric power. Especially with the development of smartphones and 5G technology, the steel-aluminum composite plate has also been applied to the production of the smartphone frame because of its unique properties.

However, due to the great difference in material properties (deformation resistance, plasticity, thermal conductivity, melting point, etc.) between steel and aluminum materials, manufacturing a steel-aluminum composite plate is challenging. In the process of rolling to produce a steel/aluminum composite plate, it is difficult to achieve the high bonding strength of the final composite plate due to the different properties of steel and aluminum.

SUMMARY OF THE INVENTION

The present invention provides a cell phone frame to solve the problem of the low bonding strength of the cell phone frame in the prior art.

The present invention provides a cell phone frame, including:
- a composite plate, the composite plate enclosing a receiving space for receiving a cell phone, the composite plate including a first plate and a second plate, wherein a first side surface of at least one of the first plate and the second plate is provided with striations, the first side surface of the second plate and the first side surface of the first plate are rolled to connect, and the striations of which adjacent striations have a pitch of 0.005 mm to 0.03 mm account for more than 90% of all the striations.

According to the cell phone frame provided in an embodiment of the present invention, a side of the composite plate facing the receiving space is provided with a recess extending along a length direction of the composite plate.

According to the cell phone frame provided in an embodiment of the present invention, the cell phone frame includes two composite plates, a first end of the composite plate forms a first bent portion towards the receiving space, a second end of the composite plate forms a second bent portion towards the receiving space, and the two composite plates are connected by the first bent portion and the second bent portion.

According to the cell phone frame provided in an embodiment of the present invention, the striations of which adjacent striations have a pitch of 0.01 mm to 0.02 mm account for more than 90% of all the striations.

According to the cell phone frame provided in an embodiment of the present invention, the striations of which adjacent striations have a pitch of 0.01 mm to 0.02 mm account for more than 80% of all the striations.

According to the cell phone frame provided in an embodiment of the present invention, the striations of which adjacent striations have a pitch of 0.01 mm to 0.02 mm account for more than 70% of all the striations.

According to the cell phone frame provided in an embodiment of the present invention, the striations of which adjacent striations have a pitch of 0.01 mm to 0.02 mm account for more than 50% of all the striations.

According to the cell phone frame provided in an embodiment of the present invention, the first side surface of the first plate has a roughness of 0.8 Ra to 4.0 Ra.

According to the cell phone frame provided in an embodiment of the present invention, the first side surface of the second plate has a roughness of 4 Ra to 10 Ra.

According to the cell phone frame provided in an embodiment of the present invention, the first plate has a greater hardness than the second plate.

According to the cell phone frame provided in an embodiment of the present invention, the first plate is a titanium plate, and the second plate is an aluminum plate.

According to the cell phone frame provided in an embodiment of the present invention, the composite plate has a shear strength $\tau = a*b*K1*K2*\sigma_{soft}$, a is a length of the first plate, b is a width of the first plate, K1 is a roughened area ratio of the first plate, and a value range of K1 is 1.5 to 3; K2 is a degree of bonding between the first plate and the second plate, a value range of K2 is 0.15 to 0.3, and when $K1*K2>1$, a product of K1 and K2 takes a value of 1; $\sigma_{soft}$ is a yield strength of the second plate, and a value range of $\sigma_{soft}$ is 350 MPa to 412 MPa.

According to the cell phone frame provided in an embodiment of the present invention, the first plate has an elongated shape, and a length direction of the striations and a width direction of the first plate is at a preset angle.

The present invention provides a method for manufacturing a cell phone frame, including steps of:
- roughening the first side surface of the first plate and/or the first side surface of the second plate;
- Rolling the first plate and the second plate asynchronously to obtain the composite plate;
- treating the composite plate by a bending process; and
- welding the composite plate treated by a bending process to obtain a cell phone frame.

According to the method for manufacturing a cell phone frame provided in an embodiment of the present invention, the step of roughening the first side surface of the first plate and/or the first side surface of the second plate includes:
- rubbing the first side surface of the first plate and/or the first side surface of the second plate with a roughening friction roller to form the striations; and removing debris from a surface of the first plate and/or the second plate.

According to the method for manufacturing a cell phone frame provided in an embodiment of the present invention, after the step of removing debris from a surface of the first plate and/or the second plate, further including:

acquiring a number of striations per unit area of the first side surface of the first plate or the first side surface of the second plate;

determining that the number of striations per unit area of the first side surface of the first plate or the first side surface of the second plate is smaller than a corresponding preset value, and controlling a lifting component to increase a height of the roughening friction roller.

According to the method for manufacturing a cell phone frame provided in an embodiment of the present invention, the step of rolling the first plate and the second plate asynchronously includes:

heating the first plate and the second plate; and rolling the heated first plate and the heated second plate asynchronously so that the first side surface of the second plate and the first side surface of the first plate are rolled to connect and produce the composite plate.

According to the method for manufacturing a cell phone frame provided in an embodiment of the present invention, after the step of rolling the heated first plate and the heated second plate asynchronously, further including:

subjecting the composite plate to a solid solution treatment; and subjecting the composite plate to aging treatment after the solid solution treatment.

According to the method for manufacturing a cell phone frame provided in an embodiment of the present invention, the solution treatment is performed at 250° C. to 450° C. for 45 min to 65 min; the aging treatment is performed at 160° C. to 200° C. for 5 h to 7 h.

According to the method for manufacturing a cell phone frame provided in an embodiment of the present invention, the first plate and the second plate feature a thickness ratio of 1.5:1.0; a differential speed ratio of the roller corresponding to the first plate to the roller corresponding to the second plate is 1:1.05, and a reduction rate of the asynchronous rolling is 20% to 40%.

According to the method for manufacturing a cell phone frame provided in an embodiment of the present invention, before the step of treating the composite plate by a bending process, further including:

straightening the composite plate.

According to the method for manufacturing a cell phone frame provided in an embodiment of the present invention, the step of straightening the composite plate includes:

straightening the composite plate in a thickness direction; and

Straightening the composite plate in a width direction.

According to the method for manufacturing a cell phone frame provided in an embodiment of the present invention, before the step of welding the composite plate treated by a bending process, further including:

shearing the composite plate treated by a bending process.

According to the cell phone frame provided in an embodiment of the present invention, the first side surface of the first plate is roughened to form striations, which increases the area of the first plate and the second plate subjected to rolling, so that a composite plate produced by combining the first plate and the second plate has a higher bonding strength, thereby ensuring that the cell phone frame is firmer.

BRIEF DESCRIPTION OF THE DRAWINGS

To explain the technical solutions of the present invention or the prior art more clearly, the following will briefly introduce the drawings necessary for the description of the embodiments or the prior art. Apparently, the drawings in the following description illustrate only some embodiments of the present invention, other drawings may be obtained by those of ordinary skills in the art based on these drawings without inventive work.

Figure 1:
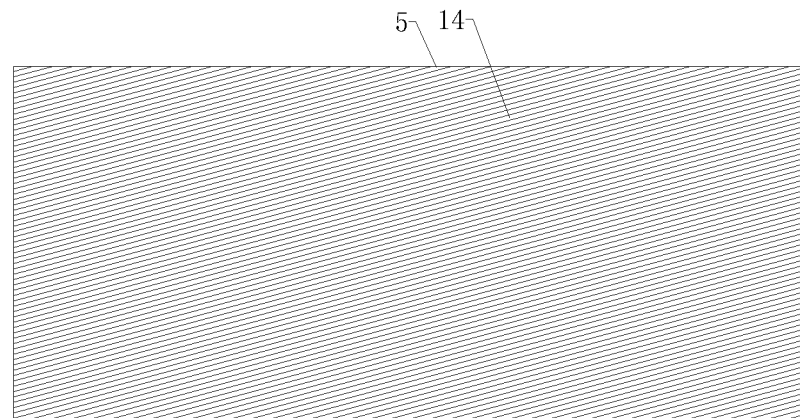
FIG. 1 is a schematic view showing a structure of a first plate according to an embodiment of the present invention.

Reference signs: 1. unwinding device; 2. camera; 3. roughening friction roller; 4. dedusting roller; 5. first plate; 6. chamber; 7. partition; 8. control terminal; 9. controller; 10. lifting component; 11. support roller; 12. dust collector; 13. air jet port; 14. striation; 15. tension control device; 16. second plate; 17. first speed sensor; 18. second speed sensor; 19. third speed sensor; 20. first straightening device; 21. second straightening device; 22. first bent portion; 23. second bent portion; 24. bending machine; 25. composite plate; 26. cell phone frame.

DETAILED DESCRIPTION OF THE INVENTION

The implementation of the present invention will be described in further detail below in conjunction with the accompanying drawings and embodiments. The following embodiments illustrate the present invention, without limiting the scope of the present invention.

In the description of the embodiments of the present invention, it should be noted that such terms as "center", "longitudinal", "transverse", "upper", "lower", "front", "rear", "left", "right", "vertical", "horizontal", "top", "bottom", "inner", "outer" and others indicating directional or positional relations are based on the positions or positional relations shown in the drawings, intended only to facilitate the description rather than indicate or imply that the device or element must have a specific orientation or must be constructed and operated in a specific orientation, and therefore cannot be understood as limiting the embodiments of the present invention. In addition, such terms as "first", "second", and "third" are only used for descriptive purposes, and cannot be understood as indicating or implying relative importance.

In the description of the embodiments of the present invention, it should be noted that, unless otherwise clearly specified and defined, such terms as "connection" and "coupling" should be understood in a broad sense. For example, the connection may be a fixed connection, a detachable connection, or integral connection; mechanical connection or electrical connection; direct connection or indirect connection through an intermediate. For those of ordinary skill in the art, the specific meanings of the above-mentioned terms in the embodiments of the present invention can be interpreted depending on specific situations.

In the embodiments of the present invention, unless otherwise clearly defined and specified, a first feature being "on" or "under" a second feature may include direct contact between the first and second features, or indirect contact through an intermediate. Moreover, the first feature being "on", "above" and "over" the second feature may indicate that the first feature is directly above or obliquely above the second feature, or simply the level of the first feature is higher than that of the second feature. The first feature being "below", "under" and "beneath" the second feature may indicate that the first feature is directly below or obliquely below the second feature, or simply the level of the first feature is lower than the second feature.

In the description of this specification, descriptions with reference to such terms as "one embodiment", "some embodiments", "examples", "specific examples", or "some examples" indicate that specific features, structures, materials, or characteristics described in conjunction with the embodiment or example are included in at least one embodiment or example of the embodiments of the present invention. In this specification, the schematic representations of the above-mentioned terms do not necessarily refer to the same embodiment or example. Moreover, the described specific features, structures, materials, or characteristics can be combined in any one or more embodiments or examples as appropriate. In addition, those skilled in the art can combine different embodiments or examples and the features of the different embodiments or examples described in this specification without contradicting each other.

A composite plate, a composite plate roughening device, and a method for manufacturing according to embodiments of the present invention will be described below with reference to FIGS. 1 to 14.

As shown in FIGS. 1 to 5, the cell phone frame 26 includes the composite plate 25, wherein the composite plate 25 encloses a receiving space for receiving the cell phone, the receiving space is shaped to fit the cell phone, and the width of the composite plate 25 is adapted to the thickness of the cell phone. The composite plate 25 includes a first plate 5 and a second plate 16, the first side surface of the first plate 5 is provided with striations 14, the first side surface of the second plate 16 and the first side surface of the first plate 5 are rolled to connect, and the striations 14 of which adjacent striations 14 have a pitch of 0.005 mm to 0.03 mm account for more than 90% of all the striations. It's tested that the shear strength of the composite plate is between 210 MPa and 245 MPa when the striations 14 of which adjacent striations 14 have a pitch of 0.005 mm to 0.03 mm account for more than 90% of all the striations.

It should be noted here that the number of the composite plate 25 may be one, in which case an end-to-end connection of the composite plate 25 forms a closed frame. Certainly, the number of the composite plates 25 may be two, three, or more, in which case the composite plates 25 are sequentially connected to form a closed frame.

According to the composite plate 25 provided in the embodiment of the present invention, the first side surface of the first plate 5 is roughened so that the first side surface of the first plate 5 is provided with the striations 14, which increases the area of the first plate 5 and the second plate 16 subjected to rolling, hence the composite plate 25 produced by combining the first plate 5 and the second plate 16 has higher bonding strength, thereby ensuring that the cell phone frame 26 is firmer.

According to the embodiment of the present invention, one side of the composite plate 25 facing the receiving space is provided with a recess extending along the length direction of the composite plate 25. The cell phone has its edge snapped into the recess when placed in the receiving space so that the cell phone frame 26 is secured around the cell phone. The cross section of the recess is C-shaped or U-shaped, and can be shaped as appropriate according to a profile of the edge of the cell phone.

According to the embodiment of the invention, the striations 14 of which adjacent striations 14 have a pitch of 0.01 mm to 0.02 mm account for more than 90% of all the striations. The more uniform the striations 14 are and the smaller the pitch between two adjacent striations 14 is, the greater the number of the striations 14 per unit area is, the larger the area subjected to rolling of the first plate 5 and the second plate 16 is, and thus the higher the bonding strength is of the composite plate 5 formed by bonding the first plate 5 and the second plate 16. It's tested that the shear strength of the composite plate is between 200 MPa and 230 MPa when the striations 14 of which adjacent striations 14 have a pitch of 0.01 mm to 0.02 mm account for more than 90% of all the striations.

According to an embodiment of the invention, the striations 14 of which adjacent striations 14 have a pitch of 0.01 mm to 0.02 mm account for more than 80% of all the striations. It's tested that a shear strength of the composite plate is between 190 MPa and 225 MPa when the striations 14 of which adjacent striations 14 have a pitch of 0.01 mm to 0.02 mm account for more than 80% of all the striations.

According to an embodiment of the invention, the striations 14 of which adjacent striations 14 have a pitch of 0.01 mm to 0.02 mm account for more than 70% of all the striations. It's tested that a shear strength of the composite plate is between 185 MPa and 220 MPa when the striations 14 of which adjacent striations 14 have a pitch of 0.01 mm to 0.02 mm account for more than 70% of all the striations.

According to an embodiment of the invention, the striations 14 of which adjacent striations 14 have a pitch of 0.01 mm to 0.02 mm account for more than 50% of all the striations. It's tested that a shear strength of the composite plate is between 170 MPa and 210 MPa when the striations 14 of which adjacent striations 14 have a pitch of 0.01 mm to 0.02 mm account for more than 50% of all the striations.

Figure 5:
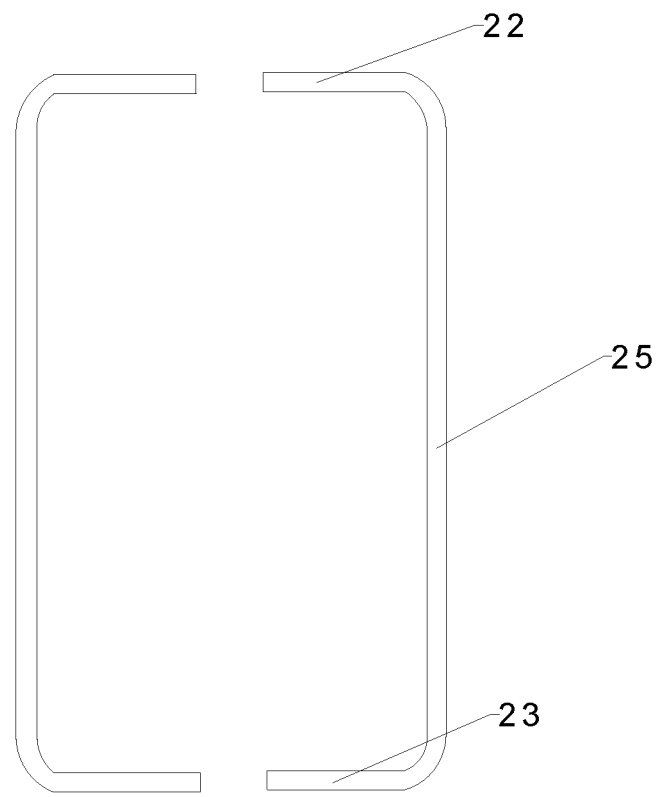
FIG. 5 is a schematic view showing a structure of the composite plate treated by a bending process according to an embodiment of the present invention.

According to an embodiment of the present invention, as shown in FIG. 5, the cell phone frame 26 includes two composite plates 25, a first end of the composite plate 25 is formed with a first bent portion 22 towards the receiving space, and a second end of the composite plate 25 is formed with a second bent portion 23 towards the receiving space. Two modes are possible for connecting two composite plates 25. For convenience of description, the two composite plates 25 are referred to as a first composite plate and a second composite plate, respectively. The two modes for connecting the two composite plates 25 are described below.

Mode 1:

The first bent portion 22 of the first composite plate is welded to the first bent portion 22 of the second composite plate, and the second bent portion 23 of the first composite plate is welded to the second bent portion 23 of the second composite plate.

It should be noted here that the first bent portion 22 of the first composite plate and the first bent portion 22 of the second composite plate may be equal lengthwise or not. The second bent portion 23 of the first composite plate and the second bent portion 23 of the second composite plate may be equal lengthwise or not, but a total length of the first bent portion 22 of the first composite plate and the first bent portion 22 of the second composite plate is equal to a total length of the second bent portion 23 of the first composite plate and the second bent portion 23 of the second composite plate.

Mode 2:

The first bent portion 22 of the first composite plate is welded to the second bent portion 23 of the second composite plate, and the second bent portion 23 of the first composite plate is welded to the first bent portion 22 of the second composite plate.

It should be noted here that the first bent portion 22 of the first composite plate and the second bent portion 23 of the second composite plate may be equal lengthwise or not. The second bent portion 23 of the first composite plate and the first bent portion 22 of the second composite plate may be equal lengthwise or not, but a total length of the first bent portion 22 of the first composite plate and the second bent portion 23 of the second composite plate is equal to a total length of the second bent portion 23 of the first composite plate and the first bent portion 22 of the second composite plate.

According to an embodiment of the invention, the striations 14 are straight striations, and the straight striations are arranged at intervals, and the pitch between two adjacent striations 14 may be consistent or not.

Herein, it should be noted that the striation 14 of the embodiment of the present invention refers to a groove formed in the first side surface of the first plate 5 and/or the first side surface of the second plate 16, and a depth of the groove is determined by the pressure applied to the roughening friction roller 3 when it works.

According to an embodiment of the invention, the striations 14 of which adjacent striations 14 have a pitch of 0.005 mm to 0.03 mm account for more than 90% of all the striations. The more uniform the striations 14 are and the smaller the pitch between two adjacent striations 14 is, the greater the number of the striations 14 per unit area is, the larger the area subjected to rolling of the first plate 5 and the second plate 16 is, and thus the higher the bonding strength is of the composite plate 25 formed by bonding the first plate 5 and the second plate 16.

According to an embodiment of the present invention, the first plate 5 has an elongated shape, there is a preset angle between a length direction of the striations 14 and a width direction of the first plate 5, and the preset angle in this embodiment may be, but is not limited to, 70° to 82°. The striations 14 of the first plate 5 serve to increase the contact area between the first plate 5 and the second plate 16 during rolling.

According to an embodiment of the present invention, the hardness of the first plate 5 is greater than the hardness of the second plate 16; since the hardness of the second plate 16 is smaller, the second plate 16 is deformed during rolling, and the second plate 16 enters the grooves of the striations 14 of the first plate 5; after the first plate 5 is cooled, the pitch of the striations 14 is reduced, and the second plate 16 is closely attached to the first plate 5 in the grooves of the striations 14, forming an interference fit, thereby bonding the first plate 5 and the second plate 16 tightly.

Herein, HV refers to Vickers hardness in kg/mm2. Vickers hardness is defined as the ratio of a load to an area of indentation formed on a surface of a specimen when a positive tetragonal diamond indenter is pressed into the surface of the specimen with the load and held for a while before unloading the test force.

According to the embodiment of the present invention, the first plate 5 is a titanium plate, and the second plate 16 is an aluminum alloy plate; however, the materials of the first plate 5 and the second plate 16 are not limited thereto, and can be selected as appropriate. Herein, the titanium plate may be a titanium plate containing various alloy components and a titanium plate containing various non-metal elements, or a titanium plate with various metallographic structures; certainly, the first plate 5 may also be a steel plate coated with a plating layer on a surface; the aluminum alloy plate may be an aluminum alloy plate containing various alloys and various proportions of components.

According to the embodiment of the present invention, the hardness of the first plate 5 is HV 270 to HV 330, the hardness of the second plate 16 is HV 50 to HV 70, the roughness of the first side surface of the first plate 5 is 0.8 Ra to 4.0 Ra, the roughness of the first side surface of the second plate 16 is 4 Ra to 10 Ra, where Ra is an arithmetic average roughness.

According to an embodiment of the present invention, the shear strength of the composite plate 25 is $\tau = a*b*K1*K2 \sigma_{soft}$, wherein a is a length of the first plate 5, b is a width of the first plate 5, K1 is a roughened area ratio of the first plate 5, and a value range of K1 is 1.5 to 3; K2 is a degree of bonding between the first plate 5 and the second plate 16, a value range of K2 is 0.15 to 0.3, and when K1*K2>1, a product of K1 and K2 takes a value of 1; $\sigma_{soft}$ is a yield strength of the second plate 16, and a value range of $\sigma_{soft}$ is 350 MPa to 412 MPa. MPa is the unit of pressure, M denotes Mega, and Pa denotes Pascal.

Figure 2:
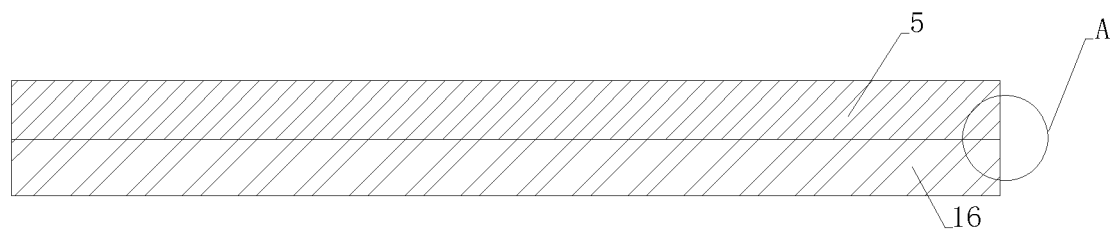
FIG. 2 is a schematic cross-sectional view of a composite plate according to an embodiment of the present invention.
Figure 3:
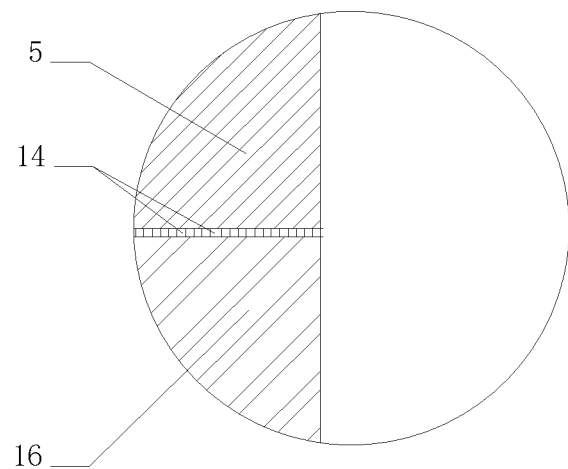
FIG. 3 is a partially enlarged structural view at A in FIG. 2 according to an embodiment of the present invention.
Figure 4:
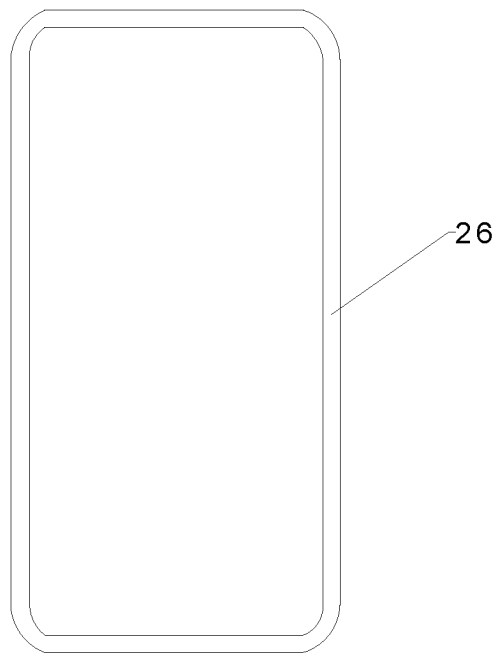
FIG. 4 is a schematic view showing a structure of a cell phone frame according to an embodiment of the present invention.

A specific embodiment of the invention is described below in connection with FIGS. 1, 2 and 3. In FIGS. 1 and 2, the composite plate 25 includes the first plate 5, which is a titanium plate, and the second plate 16, which is an aluminum alloy plate. The first side surface of the titanium plate is provided with the striations 14, wherein the striations 14 are straight striations arranged at intervals. The striations 14 of which adjacent ones have a pitch of 0.02 mm account for more than 90% of all the striations 14. The titanium plate has an elongated shape, an angle of 78° is included between the length direction of the striations 14 and the width direction of the titanium plate, the hardness of the titanium plate is HV 300, and the roughness of the first side surface of the titanium plate is 2 Ra.

A thickness ratio of the titanium plate to the aluminum alloy plate is 1.5:1.0, and the roughness of the first side surface of the aluminum alloy plate is 3 Ra. The first side surface of the aluminum alloy plate and the first side surface of the titanium plate are rolled to connect to form the composite plate 25, wherein the shear strength of the composite plate 25 is $\tau=a*b*K1*K2*_{soft}$, a is the length of the titanium plate, b is the width of the titanium plate, K1 is the roughened area ratio of the titanium plate, and K1 takes a value of 2; K2 is the degree of bonding between the titanium plate and the aluminum alloy plate, and K2 takes a value of 0.2; when K1*K2>1, the product of K1 and K2 is 1; $\sigma_{soft}$ is the yield strength of aluminum alloy plate, and $\sigma_{soft}$ takes a value of 380 MPa.

Embodiments of the present invention provide a composite plate 25 in which the first side surface of the first plate 5 and/or the first side surface of the second plate 16 are roughened so that the first side surface of the first plate 5 and/or the first side surface of the second plate 16 are provided with the striations 14 to increase the area of the first plate 5 and the second plate 16 subjected to rolling, hence the composite plate 25 produced after the first plate 5 and the second plate 16 are combined has a higher bonding strength and thus a stronger bonding. The composite plate 25 produced by rolling according to the embodiment of the present invention has a high shear forth and features a strong bonding, which satisfies the design requirement. The resulting composite plate 25 has a strong bonding strength and is suitable to be machined as a cell phone frame, in which case, it satisfies the requirement of minimal signal shielding for a cell phone and a low ratio of strength to weight.

Figure 6:
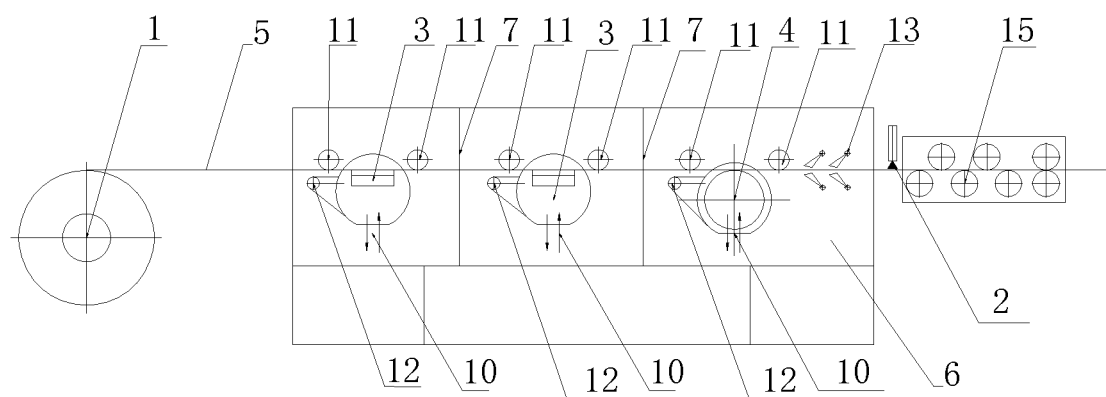
FIG. 6 is a first schematic view showing a structure of a composite plate roughening device according to an embodiment of the present invention.
Figure 7:
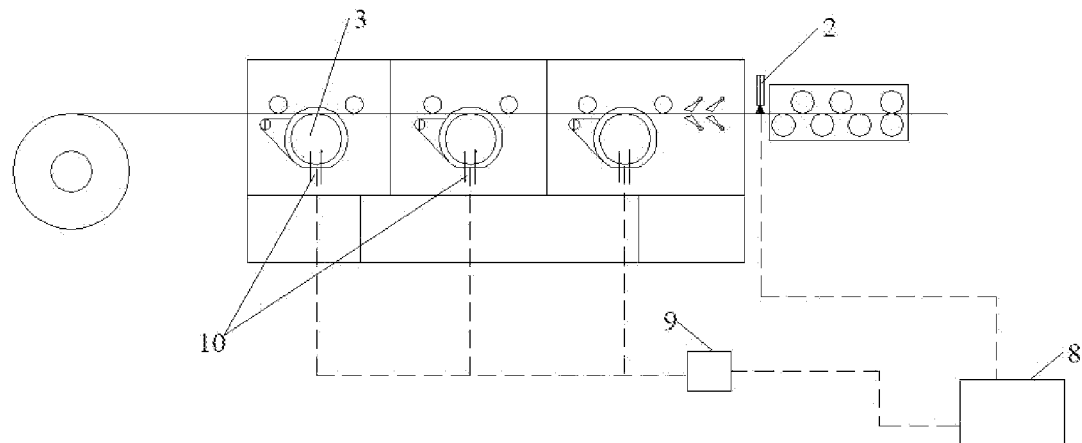
FIG. 7 is a second schematic view showing the structure of the composite plate roughening device according to an embodiment of the present invention.

The present invention also provides a composite plate roughening device, as shown in FIGS. 6 and 7, for use in the manufacture of the composite plate according to any of the embodiments described above. The composite plate roughening device includes a roughening device, the roughening device includes a machine body, a first driving member and at least one roughening friction roller 3 rotatably disposed on the machine body, and the roughening friction roller 3 is configured for rubbing the first side surface of the first plate 5 or the first side surface of the second plate 16. there is a preset angle between an axis of the roughening friction roller 3 and a first direction, and the preset angle is 700 to 820 or 90° in this embodiment. The first driving member is configured for driving the roughening friction roller 3 to rotate axially, and the first driving member includes a first motor and a first transmission member, wherein a rotating shaft of the first motor is connected to the roughening friction roller 3 via the first transmission member, the first transmission member can be a combination of a belt and a pulley, a combination of a gear and a chain, or a combination of a plurality of gears, and the specific structure of the first transmission member is not limited by examples herein, as long as the roughening friction roller 3 can be driven to rotate.

Herein, it should be noted that as shown in FIG. 6, a second direction is a left-right direction in FIG. 6, and the first direction is a front-rear direction in FIG. 6. When the roughening device works, the first plate 5 or the second plate 16 moves in the second direction and comes into contact with the roughening friction roller 3, and the rotating roughening friction roller 3 rubs the first side surface of the first plate 5 or the first side surface of the second plate 16, so that the first side surface of the first plate 5 or the first side surface of the second plate 16 is provided with the striations 14.

According to an embodiment of the present invention, the roughening friction roller 3 includes a grinding belt with a mesh number of 40 to 120, the linear speed of the grinding belt: 9-10 m/S, the speed of the first plate is 4-6 m/min, the overlapping amount of the grinding belt is 0.02 mm, the material of the grinding belt support roller is rubber, the hardness is HS60-75. The pressure applied to the grinding belt when it works determines the depth and number of the striations 14, and the mesh number of the grinding belt determines the width of the striation 14.

According to an embodiment of the present invention, the roughening device further includes a dedusting component, the dedusting component includes a dedusting roller 4 rotatably disposed on the machine body and having an axis extending in the first direction, and a second driving member. The roughening friction roller 3 and the dedusting roller 4 are successively arranged at intervals along the second direction, two support rollers 11 rotatably connected to the machine body are disposed above each of the roughening friction roller 3 and the dedusting roller 4, and the two support rollers 11 are spaced apart. The support roller 11 is configured for cooperating with the roughening friction roller 3 and the dedusting roller 4, so as to limit the first plate 5 or the second plate 16 subjected to the roughening treatment and ensure that the roughening friction roller 3 and the dedusting roller 4, respectively, have good contact with the plate. The second driving member is configured for driving the dedusting roller 4 to rotate axially and includes a second motor and a second transmission member, and a rotating shaft of the second motor is connected to the dedusting roller 4 via the second transmission member. The second transmission may be a combination of a belt and a pulley, a combination of a gear and a chain, or a combination of a plurality of gears. The dedusting roller 4 is a brush roller to remove debris from the surface of the first plate 5 or the second plate 16 upon contact with the first side surface of the first plate 5 or the first side surface of the second plate 16.

In the working process of the roughening device, the first side surface of the first plate 5 or the first side surface of the second plate 16 is roughened by the roughening friction roller 3, and then the debris is removed from the surface of the first plate 5 or the second plate 16 by the dedusting roller 4, so as to ensure that the roughened surface of the first plate 5 or the roughened second plate 16 is clean, and then the subsequent work such as rolling is performed.

Herein, it should be noted that only one dedusting roller 4 is provided in this embodiment, but two or more dedusting rollers 4 may be provided as appropriate. The debris includes, but is not limited to, metal debris and dust, but may be other substances.

According to an embodiment of the present invention, the dedusting component further includes a dust collector 12 provided at an outer periphery of at least one of the roughening friction roller 3 and the dedusting roller 4, and air jet ports 13. The dust collector 12 is connected to a negative pressure device via a pipeline, and the dust collector 12 can suck up the dust near the roughening friction roller 3 and the dedusting roller 4 to prevent air pollution. The air jet ports 13 are disposed in the machine body on a side of the dedusting roller 4 facing away from the roughening friction roller 3. The air jet port 13 is connected to an air supply device via a pipeline, and the air supply device provides a high-speed air flow to the air jet ports 13. In this embodiment, the air jet ports 13 are arranged in two rows up and down, and the two rows of air jet ports 13 are spaced at a certain distance to facilitate the passage of the first plate 5 or the second plate 16. When the first plate 5 or the second plate 16 passes through the space between the upper and lower rows of air jet ports 13, the air jet ports 13 jet a high-speed air flow to the first plate 5 or the second plate 16 to remove debris from the surface of the first plate 5 or the second plate 16 and ensure a clean surface of the first plate 5 or the second plate 16 so that the camera 2 can capture a clear image, facilitating subsequent rolling and other processes.

According to an embodiment of the present invention, the roughening device further includes a housing, wherein the machine body is disposed inside the housing, partitions 7 are arranged at intervals inside the housing to divide the interior of the housing into a plurality of chambers 6, and the roughening friction roller 3 and the dedusting roller 4 are respectively positioned in corresponding chambers 6. The partition 7 between two adjacent chambers 6 is provided with through holes (not shown) which facilitate the passage of the first plate 5 or the second plate 16. Because of the partitions 7 inside the housing, the interior of the housing is divided into a plurality of smaller chambers 6, which enhances the dedusting effect of the dust collector 12.

According to an embodiment of the present invention, the roughening device further includes a lifting component 10 connected to the roughening friction roller 3 for changing the height of the roughening friction roller 3. The outer diameter of the roughening friction roller 3 is reduced if the roughening friction roller 3 rubs the first plate 5 or the second plate 16 for a period of time, so the number of striations 14 formed in the roughening process falls short of the design requirement. Therefore, it is necessary to increase the height of the roughening friction roller 3 by the lifting component 10 so that the roughening friction roller 3 is in full contact with the first side surface of the first plate 5 or the first side surface of the second plate 16. In this embodiment, the lifting component 10 is a lead screw component composed of a servo motor and a lead screw, a sliding block of the lead screw component is connected to the roughening friction roller 3, and the servo motor drives the lead screw to rotate, thereby pushing the roughening friction roller 3 to slide up and down and then changing the height of the roughening friction roller 3. Certainly, the type of the lifting component 10 is not limited thereto, as long as the roughening friction roller 3 can be driven.

According to an embodiment of the present invention, the composite plate roughening device further includes a detection device, and the detection device includes a control terminal 8, a controller 9, and a camera 2. The camera 2 is positioned below the first plate 5 or the second plate 16, and the camera 2 faces towards the first side surface of the first plate 5 or the first side surface of the second plate 16, that is, the camera 2 is oriented upwards. The camera 2 is configured to acquire image information of the first side surface of the first plate 5 or the first side surface of the second plate 16. The controller 9 is electrically connected to the lifting component 10, and the controller 9 is configured for controlling the lifting component 10 to start and stop. The control terminal 8 is electrically connected to the controller 9 and the camera 2, respectively, and the control terminal 8 is configured for determining that the number of striations per unit area of the first side surface of the first plate 5 or the first side surface of the second plate 16 is greater than a corresponding preset value or determining that the number of striations per unit area of the first side surface of the first plate 5 or the first side surface of the second plate 16 is smaller than the corresponding preset value, and controlling the lifting component 10 to increase the height of the roughening friction roller 3.

According to an embodiment of the present invention, the composite plate roughening device further includes an unwinding device 1 provided at a side of the roughening friction roller 3 facing away from the dedusting roller 4 for winding the first plate 5 or the second plate 16 and releasing the first plate 5 or the second plate 16 under the traction of the driving component, and a tension control device 15. The tension control device 15 is provided on the side of the dusting roller 4 facing away from the roughening friction roller 3, and the tension control device 15 is configured for driving the first plate 5 or the second plate 16 to move in the second direction and to tension it as appropriate. The tension control device 15 is composed of a plurality of cylindrical bars and a driving motor, wherein the driving motor is connected to the cylindrical bars, the first plate 5 or the second plate 16 is clamped between the cylindrical bars and driven to move along the second direction by rotating the cylindrical bars. Driven by the tension control device 15, the first plate 5 or the second plate 16 is released from the unwinding device 1 with a preset tension and sequentially passes through the roughening friction roller 3 and the dedusting roller 4.

An embodiment of the invention is described below in connection with FIGS. 6 and 7. In FIGS. 6 and 7, the composite plate roughening device includes the roughening device, the detection device, the unwinding device 1, and the tension control device 15, wherein the unwinding device 1, the roughening device and the tension control device 15 are successively arranged along the second direction, namely, the unwinding device 1 is positioned left to the roughening device, and the tension control device 15 is positioned right to the roughening device.

The roughening device includes the machine body, the first driving member, two roughening friction rollers 3, the dedusting component, the housing, and the lifting component 10, wherein the machine body is disposed inside the housing, the two roughening friction rollers 3 are rotatably disposed on the machine body, the roughening friction rollers 3 are configured for rubbing the first side surface of the first plate 5 or the first side surface of the second plate 16, there is a preset angle between the axis of the roughening friction rollers 3 and the first direction, and the preset angle is 80° in this embodiment. The first driving member includes the first motor and the first transmission member, wherein the rotating shaft of the first motor passes through the first transmission member and the roughening friction roller 3, and the first transmission member can be a combination of a belt and a pulley, a combination of a gear and a chain, or a combination of a plurality of gears.

The dedusting component includes the dedusting roller 4, the second driving member, the dust collector 12 and the air jet port 13, the dedusting roller 4 being rotatably disposed in the machine body, the axis of the dedusting roller 4 extending in the first direction. The roughening friction roller 3 and the dedusting roller 4 are successively arranged at intervals in the second direction, and the dedusting roller 4 is positioned right to two roughening friction rollers 3. Two support rollers 11 rotatably connected to the machine body are disposed above each of the roughening friction roller 3 and the dedusting roller 4, and the two support rollers 11 are spaced apart. The support roller 11 cooperates with the roughening friction roller 3 and the dedusting roller 4 to limit the first plate 5 or the second plate 16 and ensure that the roughening friction roller 3 and the dedusting roller 4 are in good contact with the plate, respectively. The second driving member is configured for driving the dedusting roller 4 to rotate axially and includes the second motor and the second transmission member, wherein the rotating shaft of the second motor is connected to the dedusting roller 4 via the second transmission member, and the second transmission member can be a combination of a belt and a pulley, a combination of a gear and a chain, or a combination of a plurality of gears. The dedusting roller 4 is a brush roller that removes debris from the surface of the first plate 5 and/or the second plate 16 by contacting the first side surface of the first plate 5 or the first side surface of the second plate 16.

When working, the roughening device roughens the first side surface of the first plate 5 or the first side surface of the second plate 16 with the roughening friction roller 3, and then removes the debris from the surface of the first plate 5 or the second plate 16 with the dedusting roller 4, so as to ensure that the surface of the first plate 5 or the second plate 16 after roughening is clean, and then the subsequent work such as rolling is performed.

Three dust collectors 12 are provided, wherein two dust collectors 12 are disposed on the periphery of the roughening friction roller 3, and the other dust collector 12 is disposed on the periphery of the dedusting roller 4; the dust collectors 12 are connected to the negative pressure device via a pipeline; the dust collectors 12 can suck up dust near the roughening friction roller 3 and the dedusting roller 4 to prevent air pollution.

A plurality of air jet ports 13 are provided, and the air jet ports 13 are provided in the machine body on a side of the dedusting roller 4 facing away from the roughening friction roller 3, namely, the air jet ports 13 are positioned right to the dedusting roller 4. The air jet port 13 is connected to the air supply device via a pipeline, and the air supply device provides a high-speed air flow to the air jet port 13. In this embodiment, the air jet ports 13 are arranged in two rows up and down, and the two upper and lower rows of air jet ports 13 are spaced apart at a certain distance so as to facilitate the passage of the first plate 5 or the second plate 16. When the first plate 5 or the second plate 16 passes through space between the upper and lower rows of air jet ports 13, the air jet ports 13 jet a high-speed air flow to the first plate 5 or the second plate 16 to further remove debris from the surface of the first plate 5 or the second plate 16 and ensure that the surface of the first plate 5 or the second plate 16 is clean and the camera 2 can capture a clear image, and thus avoid the influence on rolling the first plate 5 and the second plate 16.

Two partitions 7 are arranged at intervals inside the housing to divide the interior of the housing into three chambers 6, two roughening friction rollers 3 are disposed in two chambers 6 in a one-to-one correspondence, and the dedusting roller 4 is disposed in the other chamber 6. The partition 7 between two adjacent chambers 6 is provided with through holes to facilitate the passage of the first plate 5 and the second plate 16. With the partitions 7 that divide the interior of the housing into a plurality of smaller chambers 6, the dedusting effect of the dust collector 12 is enhanced.

The lifting component 10 is connected to the roughening friction roller 3 for changing the height of the roughening friction roller 3. The brush filament will be worn after the first side surface of the first plate 5 or the first side surface of the second plate 16 are treated by the roughening friction roller 3 for a period of time while, and the outer diameter of the roughening friction roller 3 is reduced, as a result, the number of the striations 14 generated by the roughening treatment falls short of the design requirement. Therefore, it is necessary to increase the height of the roughening friction roller 3 with the lifting component 10 so that the roughening friction roller 3 is in full contact with the first side surface of the first plate 5 or the first side surface of the second plate 16. In this embodiment, the lifting component 10 is a lead screw component composed of a servo motor and a lead screw, a sliding block of the lead screw component is connected to the roughening friction roller 3, and the servo motor drives the lead screw to rotate, thereby pushing the roughening friction roller 3 to slide up and down and changing the height of the roughening friction roller 3. Certainly, the lifting component 10 is not limited this type, and other types are possible.

The detection device includes the control terminal 8, the controller 9, and the camera 2, wherein the camera 2 is positioned below the first plate 5 or the second plate 16 and faces the first side surface of the first plate 5 or the first side surface of the second plate 16, and the camera 2 is configured for acquiring image information about the first side surface of the first plate 5 or the first side surface of the second plate 16. The controller 9 is electrically connected to the lifting component 10 and configured for controlling the lifting component 10 to start and stop. The control terminal 8 is electrically connected to the controller 9 and the camera 2, respectively, and configured for determining that the number of striations per unit area of the first side surface of the first plate 5 or the first side surface of the second plate 16 is greater than a corresponding preset value, or determining that the number of striations per unit area of the first side surface of the first plate 5 or the first side surface of the second plate 16 is smaller than the corresponding preset value, and controlling the lifting component 10 to increase the height of the roughening friction roller 3.

The unwinding device 1 is provided on a side of the roughening friction roller 3 facing away from the dedusting roller 4 and configured for winding the first plate 5 or the second plate 16 and releasing the first plate 5 or the second plate 16 under the traction of the tension control device 15.

The tension control device 15 is provided on a side of the dedusting roller 4 facing away from the roughening friction roller 3, the tension control device 15 is provided right to the dedusting roller 4 and configured for driving the first plate 5 or the second plate 16 to move in the second direction. The tension control device 15 is composed of a plurality of cylindrical bars and a driving motor, wherein the driving motor is connected to the cylindrical bars, the first plate 5 or the second plate 16 is clamped between the cylindrical bars and driven to move in the second direction by rotating the cylindrical bars. Driven by the tension control device 15, the first plate 5 or the second plate 16 is released from the unwinding device 1 with a preset tension, and the roughening friction roller 3 can be brought into good contact with the first plate 5 or the second plate 16 by tensioning the first plate 5 or the second plate 16.

The composite plate roughening device provided in the embodiment of the present invention roughens the first side surface of the first plate 5 so that the first side surface of at least one of the first plate 5 and the second plate 16 is provided with the striations 14, which increases the area of the first plate 5 and the second plate 16 subjected to rolling, hence the composite plate produced by rolling the first plate 5 and the second plate 16 has a higher bonding strength and thus a stronger bonding. The composite plate produced with the composite plate roughening device of the present invention has a high shear force and features a tight bonding, which satisfies the design requirement. The resulting composite plate has a strong bonding strength and is suitable to be machined as a cell phone frame, and it satisfies the requirement of minimal signal shielding for a cell phone and a low ratio of strength to weight.

Figure 8:
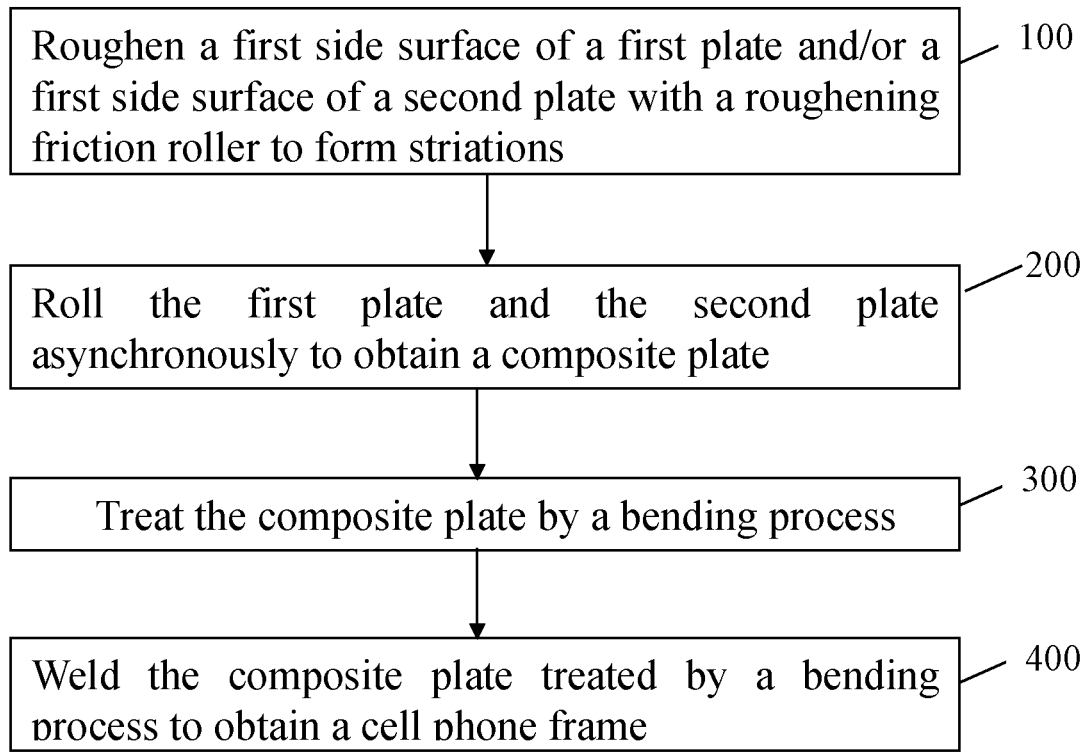
FIG. 8 is a flow chart showing a method for manufacturing a cell phone frame according to an embodiment of the present invention.
Figure 9:
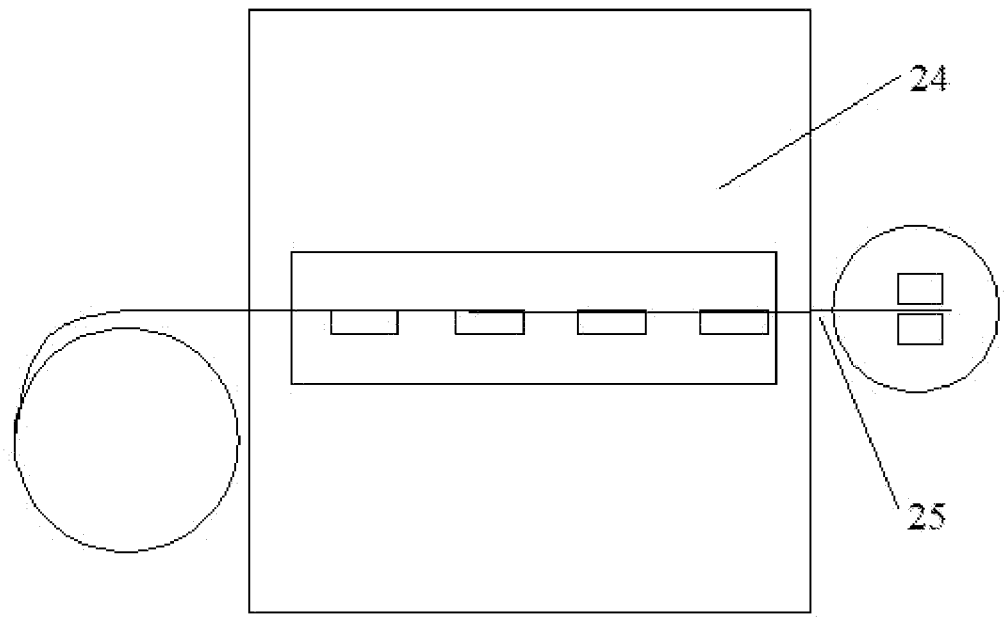
FIG. 9 is a first schematic view showing how to treat the composite plate by a bending process according to the embodiment of the present invention.
Figure 10:
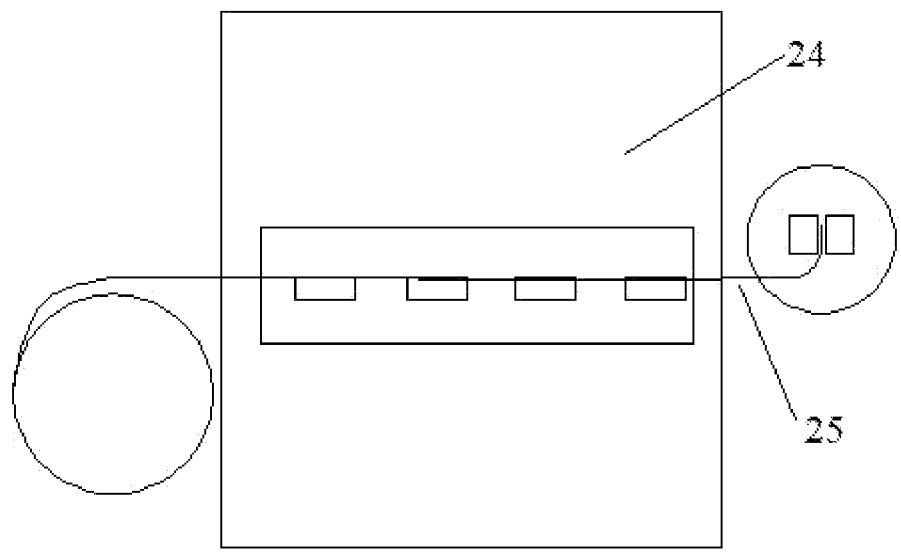
FIG. 10 is a second schematic view showing how to treat the composite plate by a bending process according to the embodiment of the present invention.
Figure 11:
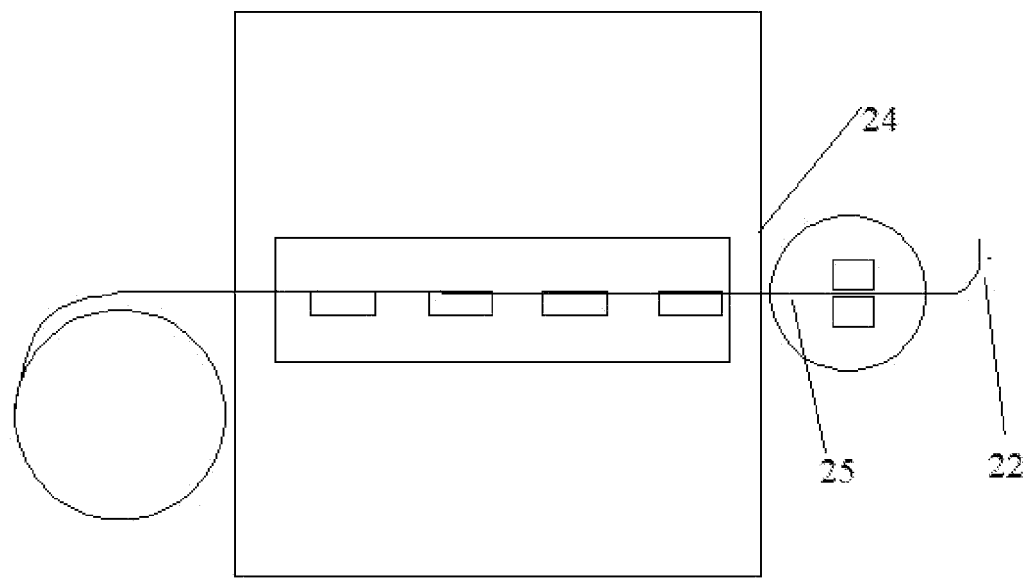
FIG. 11 is a third schematic view showing how to treat the composite plate by a bending process according to the embodiment of the present invention.
Figure 12:
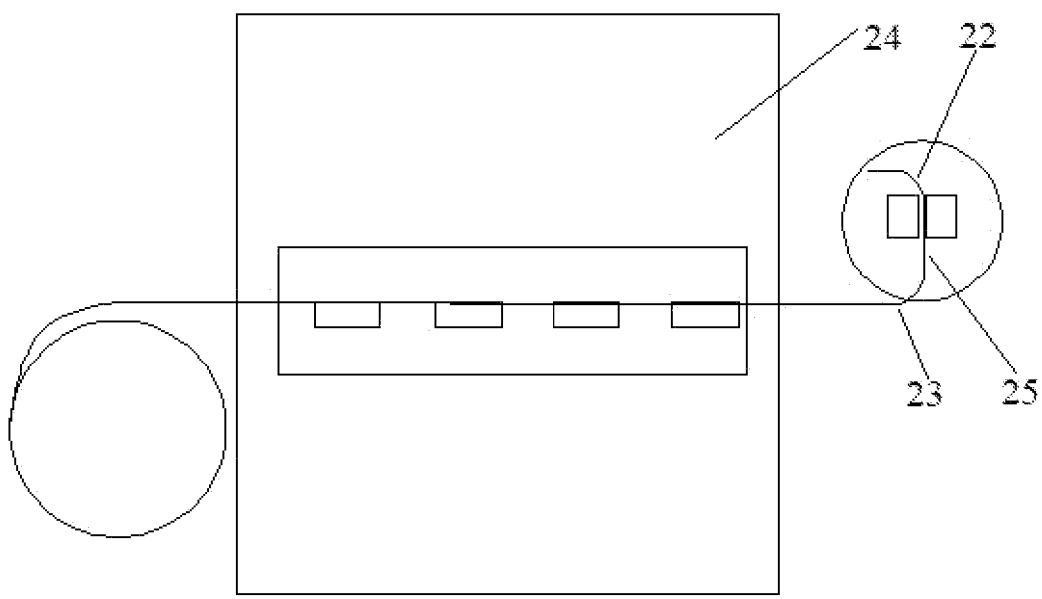
FIG. 12 is a fourth schematic view showing how to treat the composite plate by a bending process according to the embodiment of the present invention.
Figure 13:
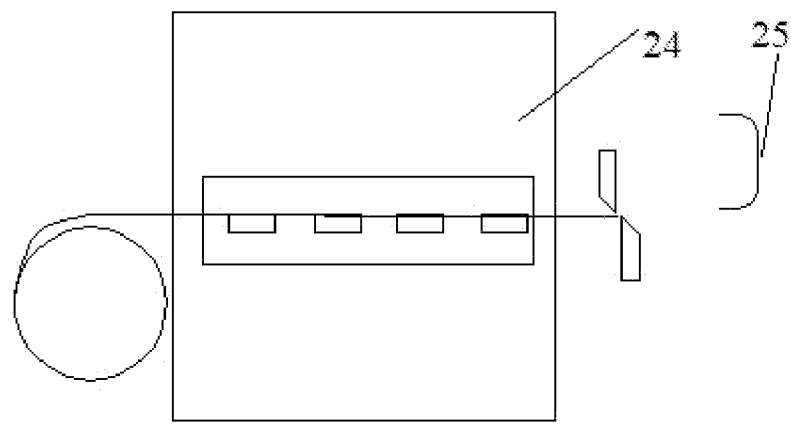
FIG. 13 is a fifth schematic view showing how to treat the composite plate by a bending process according to the embodiment of the present invention.

The present invention also provides a method for manufacturing a cell phone frame 26 according to any of the above embodiments. As shown in FIG. 8, the method for manufacturing a cell phone frame includes the steps as follows.

Step 100, the first side surface of at least one of the first plate 5 and the second plate 16 is rubbed by the roughening friction roller 3 to form the striations 14;

the roughening process is to form groove-like straight striations in the first side surface of at least one of the first plate 5 and the second plate 16.

In the process of contacting with the first side surface of the first plate 5 or the first side surface of the second plate 16, the roughening friction roller 3 rubs to form the striations 14; the roughening friction roller 3 rotates at a constant speed, and the first plate 5 and the second plate 16 move at a constant speed in the second direction, so the striations 14 formed in the first side surface of the first plate 5 and the first side surface of the second plate 16 are straight striations arranged at intervals, and there is a preset angle between the straight striations and the width direction of the first plate 5 or the second plate 16. The striations 14 of which adjacent ones have a pitch of 0.005 to 0.03 mm account for more than 90% of all the striations 14. The roughening treatment may be performed once, or may be performed two or more times.

Step 200, the first plate 5 and the second plate 16 are asynchronously rolled to obtain the composite plate.

Step 300, the composite plate 25 is treated by a bending process;

As shown in FIGS. 9 to 13, the bending process mainly includes: bending the first end of the composite plate 25 firstly by a bending machine 24 so that the first end of the composite plate 25 forms the first bent portion 22 towards the receiving space; and bending the second end of the composite plate 25 by the bending machine 24 so that the second end of the composite plate 25 forms the second bent portion 23 towards the receiving space. Finally, the composite plate 25 is sheared, and the resulting composite plate 25 treated by the bending process is U-shaped.

Certainly, it is possible to bend only the first end of the composite plate 25 by the bending machine 24, and then the composite plate 25 is sheared; at this time, the composite plate 25 is L-shaped, and four L-shaped composite plates 25 are successively connected to form a rectangular cell phone frame 26.

Step 400, the composite plate 25 treated by a bending process is welded to obtain the cell phone frame 26.

In this embodiment, both the first side surface of the first plate 5 and the first side surface of the second plate 16 are subjected to the roughening treatment, although only the first side surface of the first plate 5 may be subjected to the roughening treatment.

The roughening friction roller includes the grinding belt, the mesh number of the grinding belt is 40 to 120, the linear speed of the grinding belt: 9-10 m/S, the speed of the first plate is 4-6 m/min, the overlapping amount of the grinding belt is 0.02 mm, the material of the grinding belt support roller is rubber, the hardness is HS60-75.

According to an embodiment of the invention, the striations of which adjacent striations have a pitch of 0.005 mm to 0.03 mm account for more than 90% of all the striations.

According to an embodiment of the present invention, before rolling the first plate 5 and the second plate 16 asynchronously, the method further includes:

step 110, removing debris from a surface of at least one of the first plate 5 and the second plate 16.

Debris on the surface of the first plate 5 or the second plate 16 can be removed during the rotation of the dedusting roller 4; when the first plate 5 or the second plate 16 moves to a position between the upper and lower rows of the air jet ports 13, the air jet ports 13 emit a high-speed air flow to the first plate 5 or the second plate 16 to further remove debris from the surface of the first plate 5 or the second plate 16 and ensure that the surface of the first plate 5 or the second plate 16 is clean and the camera 2 can capture a clear image, and thus avoid the influence on combining the first plate 5 and the second plate 16.

According to an embodiment of the present invention, after the step of removing the debris from the surface of at least one of the first plate 5 and the second plate 16, the method further includes:

step 120, acquiring the number of striations per unit area of the first side surface of the first plate 5 or the first side surface of the second plate 16;

acquiring, by the camera 2, image information of the first side surface of the first plate 5 or the first side surface of the second plate 16, and transmitting the image information to the control terminal 8.

In step 130, the number of striations per unit area of the first side surface of the first plate 5 or the first side surface of the second plate 16 is determined to be smaller than a corresponding preset value, and the lifting component 10 is controlled to increase the height of the roughening friction roller 3.

When the control terminal 8 determines that the number of striations per unit area of the first side surface of the first plate 5 or the first side surface of the second plate 16 is smaller than the corresponding preset value, the control terminal 8 sends a control instruction to the controller 9, and the controller 9 controls the lifting component 10 to rise according to the control instruction, thereby increasing the height of the roughening friction roller 3 and bringing the roughening friction roller 3 into close contact with the first side surface of the first plate 5 or the first side surface of the second plate 16.

The number of striations per unit area of the first side surface of the first plate 5 or the first side surface of the second plate 16 is determined to be greater than the corresponding preset value. The control terminal 8 calculates the number of striations per unit area according to the acquired image information, and if the number of striations per unit area of the first side surface of the first plate 5 or the first side surface of the second plate 16 is determined to be greater than the corresponding preset value, then the roughening friction roller 3 is in good contact with the first side surface of the first plate 5 or the first side surface of the second plate 16, without the need to increase the height of the roughening friction roller 3.

According to an embodiment of the invention, the step of rolling the first plate 5 and the second plate 16 asynchronously includes:

step 210, heating the first plate 5 and the second plate 16, wherein an online heating method is used, specifically, an eddy current heating method is employed to heat the first plate 5 to 350° C. By means of online heating, the first side surface of the first plate 5 and the first side surface of the second plate 16 can be rolled to combine in a semi-molten state to further improve the bonding strength of the composite plate.

The asynchronous rolling in the embodiment of the present invention refers to rolling a titanium plate and an aluminum alloy plate (i.e., the first plate 5 and the second plate 16) into a composite plate with rollers arranged up and down at different speeds.

Step 220, the heated first plate 5 and the heated second plate 16 are rolled asynchronously, so that the first side surface of the second plate 16 and the first side surface of the first plate 5 are rolled to connect to form the composite plate.

The asynchronous rolling is applied to rolling the first plate 5 and the second plate 16, the first plate 5 and the second plate 16 feature a thickness ratio of 1.5:1.0; a differential speed ratio of the roller corresponding to the first plate 5 to the roller corresponding to the second plate 16 is 1:1.05, and a reduction rate of the asynchronous rolling is 20% to 40%.

In the embodiment of the present invention, the first plate 5 is heated online, that is, the titanium plate is heated online, so that the striations 14 in the surface of the titanium plate are thermally expanded to widen and deepen the grooves of the striations 14. The heated titanium plate and the aluminum alloy plate with a lower hardness are rolled to combine by the upper and lower rollers, the aluminum alloy plate is pressed into the groove in the titanium surface on a roughened surface where the aluminum alloy plate and the titanium plate are combined because of a much greater hardness of the titanium plate than that of the aluminum alloy plate; moreover, the titanium plate is cooled to shrink, and the surface of the aluminum alloy plate is heated to expand, so that the titanium plate and the aluminum alloy plate are closely attached on both sides of the groove to form an interference fit, thereby forming a strong bonding between the titanium plate and the aluminum alloy plate.

According to the embodiment of the present invention, after asynchronously rolling the heated first plate 5 and the heated second plate 16, the method further includes the steps as follows.

Step 230, the composite plate is subjected to a solid solution treatment,
wherein the solid solution treatment includes a heating stage and a cooling stage, and in the heating stage, the composite plate is put into a solid solution furnace for the solid solution treatment, the solid solution treatment is performed at 250° C. to 450° C. for 45 min to 65 min. In the cooling stage, the composite plate 5 is rapidly cooled and the composite plate is finally cooled to normal temperature. By subjecting the composite plate to the solid solution treatment, the bonding strength of the composite plate is further improved.

Step 240, the composite plate after the solid solution treatment is aged.

An aging treatment is required after the solid solution treatment of the composite plate. The aging treatment is performed in an aging furnace at 160° C. to 200° C. for 5 h to 7 h. By aging the composite plate, the bond strength of the composite plate can be further improved.

According to an embodiment of the present invention, before the step of treating the composite plate 25 by a bending process, the method further includes the steps as follows.

Step 250, the composite plate 25 is straightened.

Figure 14:
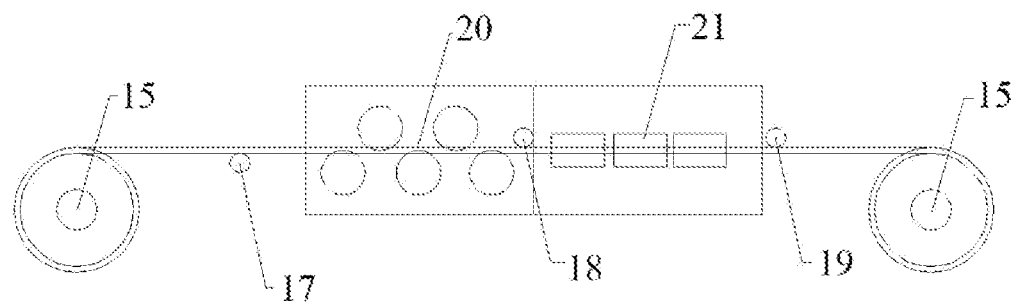
FIG. 14 is a schematic view showing how to straighten the composite plate according to an embodiment of the present invention.

As shown in FIG. 14, the composite plate 25 may bend in one direction in the case of rolling two different types of metal plates, it is then necessary to straighten the composite plate 25, which requires a tensile force applied to the composite plate 25 in the second direction in the straightening process to prevent the resulting composite plate 25 from bending or warping. The straightening treatment is carried out by a bidirectional combined straightening machine, which is a conventional device in industrial production and will not be described in detail here.

According to an embodiment of the invention, the step of straightening the composite plate 25 includes the sub-steps as follows.

Step 251, the composite plate 25 is straightened in a thickness direction;

As shown in FIG. 14, the thickness direction of the composite plate 25 is denoted as a third direction, which is perpendicular to the first direction and the second direction, respectively. When the composite plate 25 is straightened in the thickness direction, a tensile force is required to be applied to the composite plate 25 in the second direction to the composite plate 25 from bending. The composite plate 25 straightened in the thickness direction is conveyed at a higher speed than the composite plate 25 not straightened in the thickness direction. The straightening treatment in the thickness direction is carried out by a first straightening device 20 of the bidirectional combined straightening machine, and a first speed sensor 17 and a second speed sensor 18 are provided respectively before and behind the first straightening device 20. The straightening treatment in the width direction is carried out by a second straightening device 21 of the bidirectional combined straightening machine, a third speed sensor 19 is provided behind the second straightening device 21. A plurality of speed sensors are arranged to measure the speed of the composite plate 25 in different stages of the straightening process to ensure that the speed of the composite plate 25 in the straightening treatment is stable, so that the composite plate 25 straightened does not bend.

Step 252, the composite plate 25 is straightened in a width direction.

As shown in FIG. 14, the composite plate 25 is straightened in the width direction, namely, the composite plate 25 is straightened in the first direction. In the process of straightening the composite plate 25 in the width direction, it is also necessary to apply a tensile force to the composite plate 25 along the second direction to prevent the composite plate 25 from bending, and the tensile force in the second direction is applied to the composite plate 25 by the tension control device of the bidirectional combined straightening machine. The composite plate 25 straightened in the width direction is conveyed at a higher speed than the composite plate 25 not straightened in the width direction. It is assumed that the composite plate 25 not straightened in the thickness direction is conveyed at a first speed V1, the composite plate 25 straightened in the thickness direction is conveyed a second speed V2, and the composite plate 25 straightened in the width direction is conveyed at a third speed V3. The value of V2/V1 is greater than 1 and smaller than or equal to 1.5, the value of V3/V2 is greater than 1 and smaller than or equal to 1.5, and the value of V2/V1 is greater than the value of V3/V2. The composite plate 25 is a titanium-aluminum alloy composite plate 25, the hardness of the titanium plate is HV 300 and the thickness thereof is 3.5 mm originally, the hardness of the aluminum alloy plate is HV 50 and the thickness thereof is 8 mm originally, however, the thicknesses of the titanium layer and the aluminum alloy layer in the composite plate 25 are the same, which are both 3.2 mm. The unit tension experienced by the composite plate 25 when straightened in the width and the thickness directions is 2.5 N/mm$^2$. According to the method for manufacturing a cell phone frame provided in the embodiment of the present invention, the first side surface of the first plate 5 is roughened to provide the first side surface of the first plate 5 with the striations 14, which increases the area of the first plate 5 and the second plate 16 subjected to rolling, hence the composite plate 25 produced by combining the first plate 5 and the second plate 16 has a higher bonding strength and thus a stronger bonding. When the composite plate 25 is straightened in the thickness direction, the speed of the composite plate 25 is different in the front and the rear, so the tensile force applied to the composite plate 25 along the second direction can prevent the resulting composite plate 25 from bending or warping. The resulting composite plate 25, if bent, often deviates from the thickness direction, so it is not necessary to apply a strong tensile force when straightening in the width direction, but a strong tensile force is necessary for straightening in the thickness direction to prevent the composite plate 25 from bending.

The composite plate 25 may bend in one direction in the case of rolling two different types of metal plates, it is then necessary to straighten the composite plate 25, which requires a tensile force applied to the composite plate 25 in the second direction in the straightening process to prevent the resulting composite plate 25 from bending or warping.

Finally, it should be noted that the above embodiments are merely illustrative of the technical solution of the present invention, rather than limiting it; although the present invention has been described in detail with reference to the foregoing embodiments, those skilled in the art will appreciate that the technical solution disclosed in the above-mentioned embodiments can still be modified, or some of the technical features thereof can be replaced by equivalents; such modifications and equivalents do not depart from the spirit and scope of the embodiments of the present invention in nature.

The invention claimed is:

1. A cell phone frame, characterized by comprising:
   a composite plate (25), the composite plate (25) enclosing a receiving space, the composite plate (25) comprising a first plate (5) and a second plate (16), wherein the first plate is a titanium plate, wherein a first side surface of the first plate (5) and a first side surface of the second plate (16) is provided with striations, the first side surface of the second plate (16) and the first side surface of the first plate (5) are rolled to connect, and adjacent striations (14) have a pitch of 0.005 mm to 0.03 mm account for more than 90% of all the striations (14).

2. The cell phone frame according to claim 1, wherein a side of the composite plate (25) facing the receiving space is provided with a recess extending along a length direction of the composite plate (25).

3. The cell phone frame according to claim 1, wherein the cell phone frame comprises two composite plates (25), a first end of the composite plate (25) forms a first bent portion (22) towards the receiving space, a second end of the composite plate (25) forms a second bent portion (23) towards the receiving space, and the two composite plates (25) are connected by the first bent portion (22) and the second bent portion (23).

4. The cell phone frame according to claim 1, wherein the first side surface of the first plate (5) has a roughness of 0.8 Ra to 4.0 Ra.

5. The cell phone frame according to claim 4, wherein the first side surface of the second plate (16) has a roughness of 4 Ra to 10 Ra.

6. The cell phone frame according to claim 1, wherein the first plate (5) has a greater hardness than the second plate (16).

7. The cell phone frame according to claim 6, the second plate (16) is an aluminum plate.

8. The cell phone frame according to claim 1, wherein the composite plate has a shear strength $\tau=a*b*K1*K2*\sigma_{soft}$, a is a length of the first plate (5), b is a width of the first plate (5), K1 is a roughened area ratio of the first plate (5), and a value range of K1 is 1.5 to 3; K2 is a degree of bonding between the first plate (5) and the second plate (16), a value range of K2 is 0.15 to 0.3, and when K1*K2>1, a product of K1 and K2 takes a value of 1; $\sigma_{soft}$ is a yield strength of the second plate (16), and a value range of $\sigma_{soft}$ is 350 MPa to 412 MPa.

9. The cell phone frame according to claim 1, wherein the first plate (5) has an elongated shape, and a length direction of the striations and a width direction of the first plate is at a preset angle.

10. A cell phone frame, characterized by comprising:
    a composite plate (25), the composite plate (25) enclosing a receiving space, the composite plate (25) comprising a first plate (5) and a second plate (16), wherein the first plate is a titanium plate, wherein a first side surface of the first plate (5) and a first side surface of the second plate (16) is provided with striations, the first side surface of the second plate (16) and the first side surface of the first plate (5) are rolled to connect, and adjacent striations (14) have a pitch of 0.01 mm to 0.02 mm account for more than 50% of all the striations (14).

11. The cell phone frame according to claim 10, wherein the striations (14) of which adjacent striations (14) have a pitch of 0.01 mm to 0.02 mm account for more than 90% of all the striations (14).

12. The cell phone frame according to claim 10, wherein the striations (14) of which adjacent striations (14) have a pitch of 0.01 mm to 0.02 mm account for more than 80% of all the striations (14).

13. The cell phone frame according to claim 10, wherein the striations (14) of which adjacent striations (14) have a pitch of 0.01 mm to 0.02 mm account for more than 70% of all the striations (14).

14. A method for manufacturing a cell phone frame, comprising the steps of:
    roughening the first side surface of the first plate (5) and the first side surface of the second plate (16) to form striations (14), wherein adjacent striations (14) have a pitch of 0.005 mm to 0.03 mm account for more than 90% of all the striations, wherein the first plate is a titanium plate;
    rolling the first plate (5) and the second plate (16) asynchronously to obtain the composite plate (25);
    treating the composite plate (25) by a bending process; and
    welding the composite plate (25) treated by a bending process to obtain a cell phone frame.

15. The method for manufacturing a cell phone frame according to claim 14, wherein the step of roughening the first side surface of the first plate (5) and/or the first side surface of the second plate (16) comprises:
    rubbing the first side surface of the first plate (5) and/or the first side surface of the second plate (16) with a roughening friction roller (3) to form the striations (14); and
    removing debris from a surface of the first plate (5) and/or the second plate (16).

16. The method for manufacturing a cell phone frame according to claim 15, after the step of removing debris from a surface of the first plate (5) and/or the second plate (16), further comprising:

acquiring a number of striations per unit area of the first side surface of the first plate (5) or the first side surface of the second plate (16);

determining that the number of striations per unit area of the first side surface of the first plate (5) or the first side surface of the second plate (16) is smaller than a corresponding preset value, and controlling a lifting component (10) to increase a height of the roughening friction roller (3).

17. The method for manufacturing a cell phone frame according to claim 14, wherein the step of rolling the first plate (5) and the second plate (16) asynchronously comprises:

heating the first plate (5) and the second plate (16); and rolling the heated first plate (5) and the heated second plate (16) asynchronously so that the first side surface of the second plate (16) and the first side surface of the first plate (5) are rolled to connect and produce the composite plate (25).

18. The method for manufacturing a cell phone frame according to claim 17, after the step of rolling the heated first plate (5) and the heated second plate (16) asynchronously, further comprising:

subjecting the composite plate (25) to a solid solution treatment; and subjecting the composite plate (25) to an aging treatment after the solid solution treatment.

19. The method for manufacturing a cell phone frame according to claim 18, wherein the solution treatment is performed at 250° C. to 450° C. for 45 min to 65 min; the aging treatment is performed at 160° C. to 200° ° C. for 5 h to 7 h.

20. The method for manufacturing a cell phone frame according to claim 14, wherein the first plate (5) and the second plate (16) feature a thickness ratio of 1.5:1.0; a differential speed ratio of the roller corresponding to the first plate (5) to the roller corresponding to the second plate (16) is 1:1.05, and a reduction rate of the asynchronous rolling is 20% to 40%.

* * * * *